United States Patent [19]

Hegyi

[11] 3,970,831
[45] July 20, 1976

[54] DIGITIZING SYSTEM FOR TAPE PLACEMENT APPARATUS

[75] Inventor: Tim T. Hegyi, Lomita, Calif.

[73] Assignee: Goldsworthy Engineering, Inc., Torrance, Calif.

[22] Filed: Jan. 8, 1975

[21] Appl. No.: 539,288

Related U.S. Application Data

[63] Continuation-in-part of Ser. No. 441,256, Feb. 11, 1974.

[52] U.S. Cl. .......................... 235/151.1; 250/202; 318/568; 156/363
[51] Int. Cl.² .................. B32B 31/00; G05B 19/18
[58] Field of Search ................... 250/202; 318/568; 235/151.11, 151.1; 156/363

[56] References Cited
UNITED STATES PATENTS

| | | | |
|---|---|---|---|
| 3,207,904 | 9/1965 | Heinz | 250/202 |
| 3,355,590 | 11/1967 | Bertram | 250/235 |
| 3,624,371 | 11/1971 | Neal et al. | 235/151.11 |
| 3,774,098 | 11/1973 | Moss | 318/568 |
| 3,775,219 | 11/1973 | Karlson | 156/363 |
| 3,852,590 | 12/1974 | Brouwer | 250/202 |

Primary Examiner—Eugene G. Botz
Attorney, Agent, or Firm—Robert J. Schaap

[57] ABSTRACT

A digitizing system for programmably digitizing a control apparatus which provides control information to a machine having a work member movable through a plurality of axes with respect to a work surface. Thus, the control apparatus may adopt the form of a numeric control apparatus which operates a tape placement machine having a shiftable gantry or carriage and which, in turn, carries a tape placement head. This tape placement head would move with respect to a receiving surface such as a mandrel in a plurality of axes in order to deposit a composite tape on the work receiving surface. A digitizing head is replaceable for a tape placement roller on the tape placement head. A tracing member is disposed on the work surface and the digitizing head contains several sensing members, such as photoelectric sensing members, to follow the tracing member. Control signals are then generated to the control apparatus informing the control apparatus of the positional movements of the digitizing head. These control signals are then used to generate a program for future movement of the tape placement head with the tape placement roller replaced for the digitizing head.

21 Claims, 12 Drawing Figures

FIG. I.

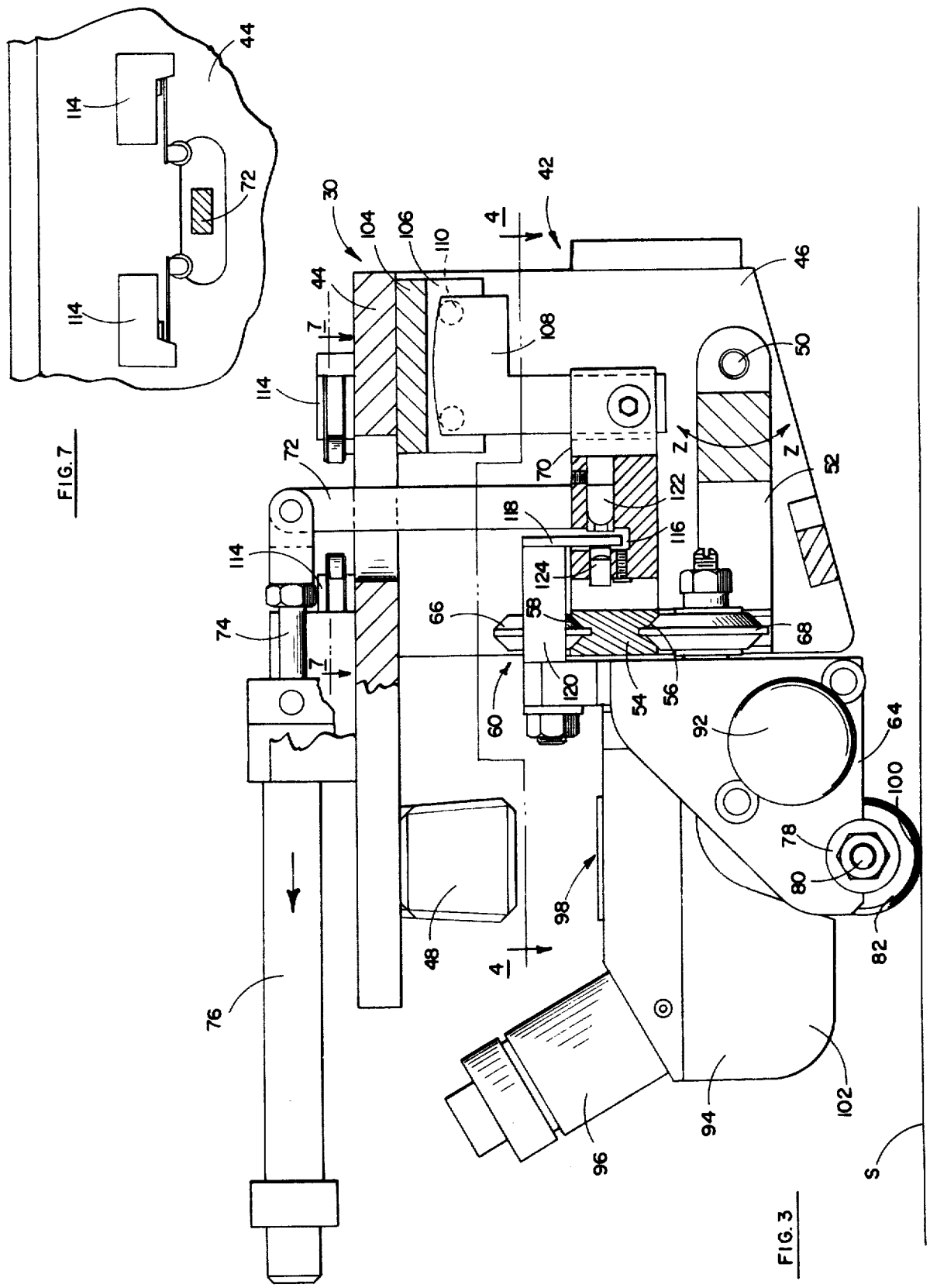

DIGITIZING SYSTEM FOR TAPE PLACEMENT APPARATUS

RELATED APPLICATION

This application is a continuation-in-part of my co-pending application, Ser. No. 441,256, filed February 11, 1974, for "Digitizing System for Tape Placement Apparatus."

BACKGROUND OF THE INVENTION

This invention relates in general to certain new and useful improvements in a system for programmably digitizing a control apparatus, and more particularly, to a system for programmably digitizing a control apparatus which provides control operation over a composite-tape placement machine.

In recent years, reinforced plastic composite materials have achieved increased prominence and have been used in the manufacture of a variety of products which are normally formed of heavy metals and other counterpart structural materials. For example, motor casings, rotor blades, tubular members such as pipes, and various other types of structural members which were formerly fabricated from various metals, are now being constructed with reinforced plastics. These reinforced plastic composite materials normally employ fiber reinforcement such as fiberglass or boron fibers in a curable resin matrix.

Many of the structural members used in the air frame industry are presently formed of aluminum and other lightweight metals. However, there has also been a recent transition to the employment of reinforced plastics in the production of the structural members. Conventional filament winding systems have been employed in the fabrication of these reinforced plastic components, but these conventional filament winding systems suffer from a number of serious drawbacks. In order to increase productivity in the manufacture of these components, resort has been made to the use of tape application or so-called "tape laying" equipment.

However, the extant tape laying equipment is ineffective in many cases because the filament reinforced tapes must be applied to a work surface in a very precise manner and within fairly close tolerance limitations.

Applying a wide filament reinforced composite tape to conform to compound curved surfaces presents a substantial problem in the presently available tape placement devices, inasmuch as it may be necessary to compensate for the bending of the tape in a span-wise direction. Accordingly, the existant tape placement heads are not capable of laying a fairly wide tape on a compound curved surface in a fair and tight manner under proper control. Furthermore, problems of unequal demand distribution across the tape's width resulting from proportional difference in elemental geodesic path lengths often arise. This unequal demand distribution will vary according to the degree of curvature and this may range from fractional amounts to very substantial dimensional differences.

Among the other problems encountered in the use of the conventional presently available tape laying machine resides in the failure of the tape laying head to properly sever the tape at a desired location, and at a pre-selected angle with respect to the work surface. Furthermore, the tape must be dispensed or unspooled under careful control and this control is difficult to maintain due to the modulus of induced rigidity in the tape. Thus, considerable problems are encountered in maintaining proper tension on the tape as it is applied to the work surface due to the fact that the convolute windings of the tape tend to expand and unwind in the manner of a released clock spring.

These problems mentioned above often require the construction of a rather complex tape placement head which must include components necessary to perform all of the required functions. In addition, the gantry machine which holds the tape placement head must be controlled in some fashion so that all functions to be performed by the tape placement head can be precisely performed in a proper time sequence. In many cases individual controls are provided for each function which require manual activation by an operator. As can be expected, manual control by an operator has proven to be relatively ineffective.

There have been several attempts to use various forms of external control apparatus, such as numeric control apparatus. However, these forms of apparatus must be properly programmed in order to control the gantry machine and the tape placement head. Thus, the numeric control apparatus must be programmed to enable the tape placement head to move in precise directions in any of a number of axes, and perhaps in several of the axes at the same time. For example, the tape placement head may be required to simultaneously shift vertically as well as transversely and longitudinally in order to cover a particular portion of a tape receiving surface. In addition, the control apparatus must be properly programmed to enable the tape placement head to compensate for variations of compound curvature on the work surface. Even more-so, the numeric control system must be properly programmed in order to timely initiate tape severing functions and the like.

In order to properly program the numeric control apparatus, very extensive programs are required which may often take several man years or more of time in order to generate the necessary program. Even more-so, the program must be revised each time that the tape size is changed or the tape receiving surface is altered. Consequently, these disadvantages of numeric control systems have militated against their use and furthermore, have militated against the use of various forms of commercially available tape laying equipment.

OBJECTS

It is, therefore, the primary object of the present invention to provide a system for programmably digitizing a central apparatus which provides operation control information to a machine having a work member movable through a plurality of axes with respect to a work surface.

It is another object of the present invention to provide a system for programmably digitizing a control apparatus of the type stated which can be used in cooperation with a tape laying machine to control the operation of the tape laying machine.

It is a further object of the present invention to provide a system for programmably digitizing a control apparatus of the type stated which is highly reliable in its operation and which can be used to program control apparatus capable of providing control information to a wide variety of controlled equipment.

It is another object of the present invention to provide a unique sensing head for use with systems of the type stated, and which sensing head includes members which move in conformance with and in direct relation to the movement of the work member on the machine.

It is an additional object of the present invention to provide a method for programmably digitizing a control apparatus which provides information to a machine having a work member movable with respect to a work surface in a plurality of axes. pg,7

It is another salient object of the present invention to provide a system of the type stated which is constructed with a high degree of precision and thereby enables the generation of a control program with an extremely high accuracy.

It is also an object of the present invention to provide a control system for programmably digitizing a control apparatus and which control system is completely automated in its operation and is highly reliable.

With the above and other objects in view, my invention resides in the novel features in form, construction, and arrangement of parts presently described and pointed out in the claims.

GENERAL DESCRIPTION

Generally speaking, the present invention relates to a system for programmably digitizing a control apparatus such as a numeric control system which provides control information to a machine having a work member movable through a plurality of axes with respect to a work surface. While the system is effective for use with a wide variety of equipment, it is described herein with reference to a tape laying machine. This tape laying machine often includes filament tape applicator (often referred to as a "tape head" or "tape placement head") which is used on a selected type of host actuating equipment, such as a gantry machine.

The tape placement head is normally shifted through X (longitudinal) and Y (transverse) coordinate axes with respect to a work surface through the action of the gantry machine. In addition, the tape placement head is constructed so that it can shift along additional axes with respect to the gantry machine. Thus, the tape placement head can shift in a Z (vertical) axis and an A axis (movement in an arcuate plane transverse to the X axis and relatively parallel to the Y axis). Furthermore, movement can be accomplished in a C axis (rotational movement of the tape placement head about a vertical axis parallel in space to the Z axis). Finally, movement of the tape placement head relative to the work surface is accomplished in the D axis (relative rotation of the work surface about an axis which is generally parallel to the X axis).

The present invention can be described in general terms as a system for programmably digitizing a control apparatus which provides operation control information to a machine having a work member operable with respect to a work surface. This work member is movable through a plurality of axes including (1) a longitudinal X axis, (2) a transverse Y axis, and (3) an arcuate A axis with movement in an arcuate plane transverse to the X axis and relatively parallel to the Y axis. This system will comprise means associated with the work surface defining a desired path of movement of the work member. A sensing head is replaceable on the machine for the work member and this sensing head comprises a support frame which is movable by the machine in the X axis and the Y axis. A first sensing means is associated with the sensing head for detecting the aforesaid desired path of movement. In this way, the sensing head provides informational signals to the control apparatus in response to movement of the sensing head on the machine. A second sensing means is also associated with the sensing head and is movable through a path conforming to the arcuate A axis. Thus, the sensing head provides informational signals to the control apparatus in response to the movement of the second sensing means.

The system for programmably digitizing the control apparatus can be characterized in that the digitizing head itself only generates analog signals from various sensory mechanisms in the head. These analog signals are used to, in turn, generate various position axis control signals. A relatively simple digitizing circuit forms part of, or is otherwise associated with, the overall central circuit to generate digital signals based on the derived analog signals. The digital signals are then introduced into a control apparatus which is designed to construct a program from the digital signals.

This system can be described in further detail in that the means associateable with the work surface to define a desired path of movement of the work member in a tracing element locatable on the work surface. The system for programmably digitizing the control apparatus can also be further characterized in that the machine is a composite tape application gantry type machine. The work member is a tape placement head, and the work surface is a member designed to receive a composite tape from the tape placement head.

In a preferred aspect of the present invention, the work member is movable through a Z (vertical) axis on the machine. Thus, the sensing head comprises a third sensing means associated therewith to provide informational signals to the control apparatus in response to vertical movement of the sensing head. Also in this preferred aspect of the present invention, this work member is capable of rotational movement about a vertical C axis, and that the work surface is capable of rotational movement about a D axis relatively parallel to the X axis. Again, the sensing head provides informational signals to the control apparatus in response to a combination movement with respect to said D axis or A axis.

The sensing head preferably includes a first movable member which is movable in relationship to the desired movement of the work member in arcuate C axis. In addition, the sensing head includes a second movable member which is movable in relationship to the desired movement of the work member in the vertical Z axis. The sensing head is described in more detail hereinafter.

The present invention can also be described in general terms as a method for programmably digitizing a control apparatus. Again, this control apparatus provides information to a machine having a work member movable with respect to a work surface in a plurality of axes. This method will generally comprise the of a tracing element on the work surface to define a desired path of movement of the work member. A sensing head on the machine is replaced for the work member. The sensing head is then moved along the work surface substantially in conformity with the tracing element. In this way, the sensing head provides first informational control signals to the control apparatus in response to movement of said sensing head on the machine.

The method for programmably digitizing the control apparatus can be characterized in further detail in that the method comprises detecting an error signal when the sensing head tends to move away from the tracing element. This method provides for the correcting of the movement of the sensing head upon detection of the error signal to permit movement of the sensing head substantially in conformity with the tracing element.

Furthermore, in a preferred aspect of the present invention, the first informational control signal provides information regarding movement of the sensing head in a longitudinal X axis with respect to the work surface. The method also comprises providing second informational control signals to the control apparatus in response to movement of the sensing head in a transverse Y axis with respect to the work surface.

In this respect the method of the present invention is similar to the apparatus in that the machine is a composite tape application gantry type machine. The work member is a tape placement head, and the work surface is a member designed to receive a composite tape from the tape placement head.

The sensing head which was briefly described above is an integral part in the programmably digitizing of the control apparatus. This sensing head comprises an outer housing. A first frame is pivotally mounted on a first axis in the housing for movement in a first plane. A first sensing means is operatively associated with the first frame and provides informational control signals to the control apparatus in response to movement of the first frame in the first plane. A second frame is shiftably mounted on the first frame for movement in a second plane relatively perpendicular to the first plane. Furthermore, a second sensing means is operatively associated with the second frame and provides informational control signals to the control apparatus in response to movement of the second frame in the second plane.

The sensing head which is used in programmably digitizing the control apparatus can be characterized in further detail in that the sensing head is moved with respect to a work surface and in conformity with the shape of a portion of the work surface. Furthermore, the sensing head is removably replaceable for a tape placement member on a tape placement head, which is capable of depositing filament containing tapes on the work surface.

In a further aspect of the present invention, the sensing head is moved with respect to the work surface and in conformity with a portion of the work surface in a longitudinal X axis, an arcuate A axis somewhat transverse to the X axis, and a vertical Z axis. In this way, the first sensing means provides informational control signals about movement in the A axis. Also, the second sensing means provides informational control signals about movement in the Z axis. In addition, a third sensing means is operatively associated with the sensing head for providing informational control signals about movement in the X axis.

In the preferred embodiment of the present invention, the sensing head is moved with respect to the work surface and in conformity with a portion of the work surface in a longitudinal X axis, and arcuate A axis somewhat transverse to the X axis and a vertical Z axis. Further, the sensing head is removably replaceable for a tape placement member on a tape placement head which is capable of depositing filament containing tape on the work surface. Thus, the first frame is movable in the same relative arcuate A axis in which the tape placement member would move. Accordingly, the first sensing means provides informational control signals about movement in the A axis. In addition, the second frame is movable in the same vertical Z axis in which the tape placement member would move. Consequently, the second sensing means provides informational control signals about movement in the Z axis.

The present invention can also be described in general terms as a control system for programmably digitizing a control apparatus which provides operation control information to a machine. Again, this machine is provided with a member, such as a work member, movable through a longitudinal X axis, and a transverse Y axis. This control system will normally comprise first sensing means which is capable of generating a combination X and Y control signal. An amplifier means receives the combined X and Y control signal. A multi-position electrical switch means thereon receives the X and Y control signals from the amplifier means. This switch means is actually a potentiometer means but which in fact serves as a voltage dividing means. This potentiometer means is often referred to herein as a "multi-position servo-gain means". A seervo-gain circuit is operatively connected across the multi-position electrical potentiometer means and the amplifier means. A means derives an X function position control signal from the switch means. An additional means derives a Y function position control signal from the switch means.

The aforesaid control system for programmably digitizing the control apparatus can by characterized in further detail in that the X function position control signal is a sine function of the original combined X and Y control signal. Furthermore, the Y function position control signal is a cosine function of the original combined X and Y control signal. In addition, the servo-gain circuit carries a servo-gain signal which is a tangent function of the original combined X and Y control signal.

In a preferred aspect of the present invention, the first sensing means comprises a sensor having a plurality of sensing element sections thereon. Each of these sensing element sections are capable of generating an individual control signal. In this case, the amplifier means comprises individual amplifiers receiving the individual control signals. In addition, the first sensing means comprises a photoelectric sensing means.

In the preferred embodiment of the present invention, the movable member on the machine is movable through a vertical Z axis. Thus, the control system comprises a second sensing means for deriving a Z function position control signal. Furthermore, this movable member is movable through an arcuate A axis which is substantially parallel in space to the Y axis and substantially perpendicular in space to the X axis. In addition to the control system comprising a second sensing means for deriving a Z function control signal, the system will also comprise a third sensing means for deriving an A function control signal.

FIGURES

Having thus described the invention in general terms, reference will now be made to the accompanying drawings in which:

FIG. 1 is a perspective view of a tape placement machine showing the plurality of axes of movement of a tape placement head carried by the gantry member of the machine and with which the digitizing system of the present invention may be used;

FIG. 3 is a side elevational view, partially broken away and in section, of a digitizing head forming part of the digitizing system of the present invention;

FIG. 7 is a horizontal sectional view taken along line 7—7 of FIG. 3;

DETAILED DESCRIPTION

Figure 2:
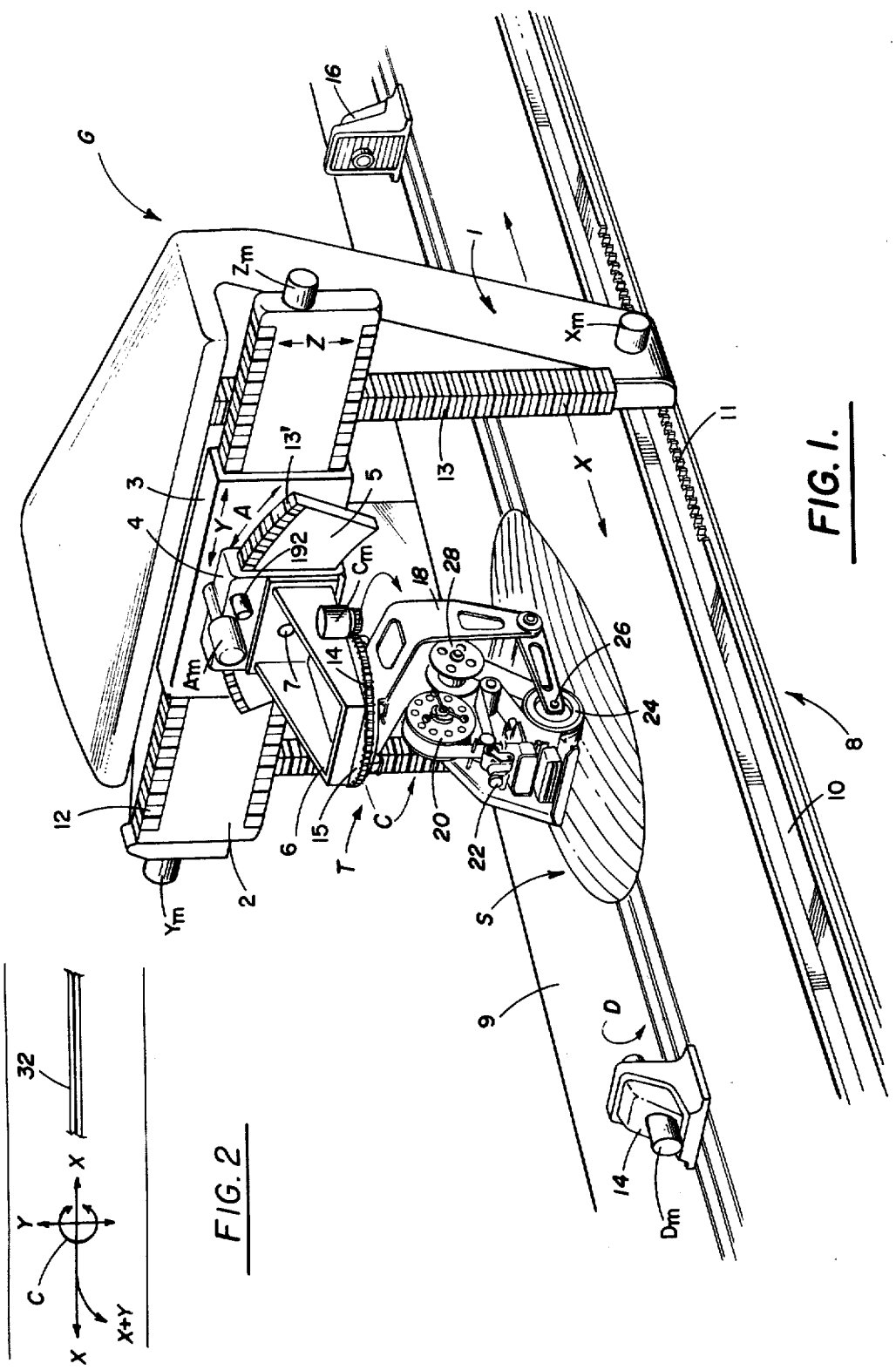
FIG. 2 is a schematic view showing a tracing member on a receiving surface and the generating of a C axis of movement with respect to X and Y axes of movement.

Referring now in more detail and by reference characters to the drawings which illustrate a preferred embodiment of the present invention, a tape placement machine includes a tape placement head designated as T and which is secured to a somewhat conventional gantry-type machine G, in the manner as illustrated in FIG. 1 of the drawings. In order to more fully understand the operation of the digitizing system of the present invention, a brief description of the tape placement head T and the gantry-type machine G is provided in order to enable an appreciation of the multiaxes movement which exists between the tape placement head T and the tape receiving surface S, often designated as a "work surface" or a "mandrel".

By reference to FIG. 1, it can be seen that the tape head T is mounted on the gantry machine G, the latter having a carriage 1 shiftable along a coordinate longitudinal axis designated as the "X axis". At its upper end, the carriage 1 is provided with a fixed transverely extending hollow support plate 2, which is mounted thereon for vertically shiftable movement, in a manner to be hereinafter described in more detail. In this case, the support plate 2 shifts vertically with respect to the work surface S in a coordinate vertical axis, designated as the "Z" axes, as illustrated in FIG. 1 of the drawings.

Mounted on the support plate 2 for transversely shiftable movement therealong, in a manner to be hereinafter described in more detail, is a mounting frame 3. In this case, the mounting frame 3 shifts transversely with respect to the work surface S in a coordinate transverse axis designated as the "Y" axis, as illustrated in FIG. 1 of the drawings.

A fixed housing 4 is mounted on the frame 3 and carries an arcuately shaped gear plate 5 in an arcuate coordinate axis which is substantially parallel to the Y coordinate axis and which arcuate axis is designated as the "A" axis. A rectangularly shaped support frame 6 is fixed to the housing 4 by means of one or more bolts 7. The frame 6 is movable in the arcuate A axis with the fixed housing 4.

The tape head T is operatively mounted on the support frame G which therefore shifts transversely with respect to the work surface S in the Y coordinate transverse axis, as illustrated in FIG. 1. The support frame 6 is also vertically shiftable on the carriage 1 so that the tape head T is shiftable in the Z coordinate vertical axis. By further reference to FIG. 1, it can be seen that the housing 4, and hence the tape head 7, is also swingable in the A arcuate coordinate axis which is substantially parallel to the Y coordinate axis, and which is also substantially perpendicular to the X coordinate axis.

The tape head T is also rotatable on the frame 12, in a manner to be hereinafter described in more detail, about a coordinate axis of rotation which is substantially parallel in space to the coordinate Z axis and which axis of rotation is designated as the "C axis". Thus, it can be observed that the tape head T is movable in five distinct coordinate axes with respect to the work surface S.

The carriage 1 is shiftable along a base, or so-called "bed", having an upper work receiving surface 9 and longitudinally extending side walls 10 (only one being shown). The carriage 1 is longitudinally shiftable along the bed 8 (in the X axis) by means of an electric motor $X_m$ mounted on the carriage 1. A pinion (not shown) rotatable by the motor $X_m$ through a conventional gear mechanism (also not shown) engages a rack 11 on one side wall 10 to shift the carriage 1 upon energization of the motor $X_m$. The mounting frame 3 is shiftable transversely on the support plate 2 on the carriage 1 through the action of an electric motor $Y_m$ mounted on the plate 2. A jackscrew and pinion arrangement within the interior of the plate and therefore not shown is operable by the motor $Y_m$ in a conventional manner. This latter named pinion operates through a slot (not shown 1) on the front face of the plate 2 against a rack (not shown) on the interior side of the mounting frame 3. Alternatively, a motor could be mounted on the frame 3 and operate a pinion arrangement to engage racks 12 on the plate 2 to shift the frame 3 transversely in the Y axis.

The plate 2 is vertically shiftable in the Z axis by means of an electric motor $Z_m$ mounted on the plate 2 and which operates a pinion on the interior of the plate 2 and therefore is not shown. This latter pinion engages a rack on the carriage 1 to create this vertical shifting movement. The actual operation of this form of drive mechanism is conventional in its construction.

The gear plate 5 is fixed on the mounting frame 3 and the housing 4 is arcuately shifted in the A axis by means of an electric motor $A_m$ mounted on the housing 4. This motor $A_m$ operates a pinion located within the housing and is therefore not shown, and which engages a gear segment 13 on the gear plate 5. Thus, energization of the motor $A_m$ will cause the housing 4 to shift in the arcuate A axis.

The tape head T is rotated in the C axis by means of an electric motor $C_m$ mounted on the underside of the support frame 6. The motor $C_m$ operates a pinion on its underside which engages a gear segment 14 on a support ring 15 forming part of the tape head T.

The work surface S actually is or forms part of a mandrel or similar member which is capable of receiving composite tape strands. It can be observed that the work surface S may be located between a pair of opposed head stocks 16 and 17. However, in many cases, the work surface S could be mounted on the head stocks 16 and 17 and supported thereby. Furthermore, the head stocks 16 and 17 have provision, in the form of electric motors $D_m$, for rotating the work surface S about a longitudinal axis extending between the head stocks 16 and 17, and which is parallel in space to the X axis. This latter coordinate axis of rotation, which enables rotatable movement of the work surface S, provides a sixth axis of movement, designated as a "D axis".

The tape placement head T may be of the type more fully illustrated and described in U.S. Pat. No. 3,775,219, dated Nov. 17, 1973. This tape placement head would normally comprise a main frame 18, which is rotatably secured to the support frame 12, and which would carry a tape supply spool 20. The composite tape which is normally used in many of the conventional tape placement heads includes filament reinforcement strands on a backing web. The backing web may be separated from the strands in order to permit the cutting of the strands at a preselected point and at a preselected angle with respect to the work surface by means of a cutting mechanism 22. Thereafter, the strands are brought into contact with the backing at a tape placement roller or so-called "lay-down" roller 24, which is rotatable on a spool shaft 26. After the tape strands are applied to the work surface S, the backing web is retrieved on a take-up spool 28, which is also rotatably mounted on the main frame 18. The remaining components and the full operation of the tape head T is more fully described in the aforementioned U.S. Pat. No. 3,775,219.

It should be understood that while the digitizing system of the present invention is described and illustrated in connection with tape placement machines of the type described, the digitizing system is effective utilizable with any control apparatus which provides operation control information to a machine having a work member movable through a plurality of axes. Normally, this tape placement machine as illustrated in FIG. 1 would be operable by a numeric control system or other form of control system N. It can be observed that the tape placement head T functions as a work member which is movable with respect to the work surface and, furthermore six distinct axes of movement do exist between the tape placement head T and the work surface S.

As indicated previously, the numeric control system would require external programming in order to provide necessary control information to move the tape placement head T in the desired paths of movement and through the various axes mentioned above. In this case, the numeric control apparatus would be programmed so that it would move the tape placement head T along the work surface S in the X longitudinal path. Thereafter, the numeric control apparatus would be programmed so that it would cause the head T to rotate approximately 180° in the arcuate C axis as well as to shift transversely in the Y axis in order to lay down an adjacent band width of tape. Furthermore, it can be observed that during the longitudinal movement, movement also occurs in the Z axis due to the compound curvature of the work surface S. Again, it can be observed that with different forms of work surfaces, all axes of movement may be required. In addition, the program in the numeric control apparatus would require alteration for different work surfaces.

The present invention provides a unique way of programming the numeric control apparatus through a digitizing hereinafter described in more detail. The digitizing system operates on the general principle that a digitizing head 30 is replacable on the tape head T for the tape placement roller 24. The digitizing head 30 operates in conjunction with a retroflective tape 32 deposited on the work surface, and this tape would normally comprise a white substrate with a continuous thin black line extending longitudinally on the surface thereof. The retroflective tape 32 normally is placed on the work surface in the desired path of movement of the tape head T, and the digitizing head is operated to follow the retroflective tape 32 and thereby generate a program for the numeric control apparatus.

FIG. 2 illustrates in schematic form, certain of the axes of movement, such as the longitudinal X axis and the transverse Y axis. It can be observed that the arcuate C axis occurs about a particular point so that rotation of the tape head T occurs on a truly vertical axis. In addition, the tape head T could move in a combination of the X and Y path, in the manner as illustrated in FIG. 2. In this case, while the tape head may be curving with respect to the longitudinal X axis and with respect to the transverse Y axis, the tape head T is merely following a path while is a combination of the X and Y axes of movement.

The digitizing head 30 is more fully illustrated in FIG. 3–7 of the drawings, and generally comprises an outer housing 42 formed by a top wall 44 and a pair of transversely spaced apart vertically depending side walls 46. Rigidly secured to a projection of the top wall 44 on the underside thereof, is a transversely extending mounting shaft 48, which replaces the spool shaft 28 on the tape head T. In this way, the digitizing head 30 can be mounted on the frame 18 and thereby replace the tape placement roller 24.

Figure 4:
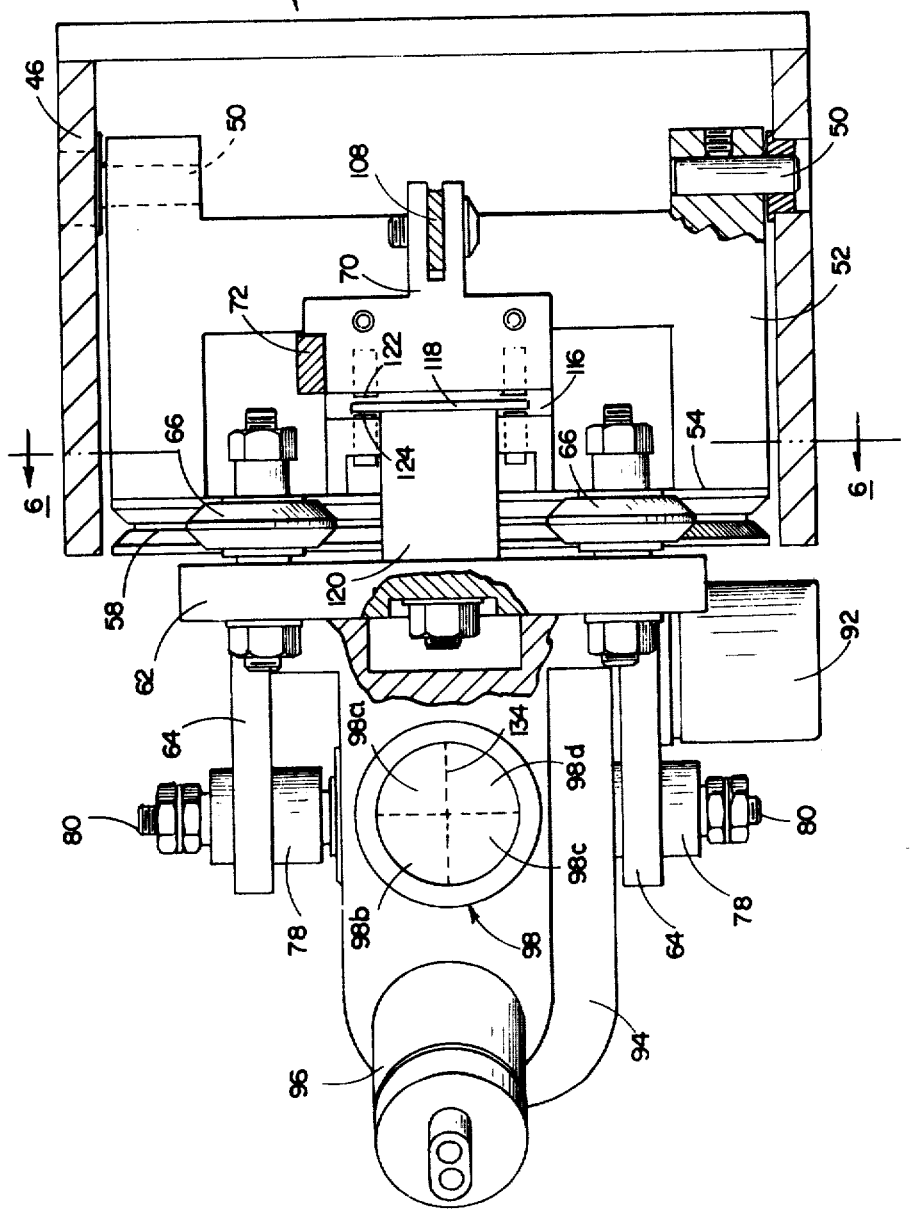
FIG. 4 is a top plan view of the digitizing head of FIG. 3, partially broken away and in section.

Pivotally mounted on the side walls 46 by means of a pair of transversely aligned coaxial pivot pins 50 is a base frame 82, which is swingable about the pivot pins 50 to represent a Z coordinate axis. Carried by the base frame 52 along the forwardly presented margin thereof, in the manner as illustrated in FIGS. 3 and 4 of the drawings, is an upstanding arcuately shaped guide rail 54, which includes a lower arcuately shaped trackway 56 and an upper accurately shaped trackway 58.

Carried by the guide rail 54 in a manner to be hereinafter described is a frame 60, which is shiftable in an arcuate path transverse to the longitudinal dimension of the tape placement head T substantially conforming to the arcuate A path of movement of the tape placement head T. The frame 60 includes a horizontally disposed cross bar 62 having a pair of transversely spaced apart vertically depending side plates 64. Rotatably mounted on the cross bar 62 are a pair of transversely spaced apart rollers 66, which are designed to ride in the upper trackway 58. Similarly mounted on the frame 60 is a lower roller 68, which is designed to ride in the lower trackway 56 of the guide rail 54, in the manner as more fully illustrated in FIGS. 3 and 6 of the drawings.

Secured to the guide rail 54 and extending rearwardly therefrom is a main bracket 70, which is spaced upwardly from the base frame 52, in the manner as illustraed in FIG. 3 of the drawings. Secured to the main bracket 70 is a vertically disposed biasing rod 72, which is actuated by means of the piston 74 of a pneumatic cylinder 76. This structure is provided in order to maintain a downwardly imposed force upon the housing 42 for all reasons which will be more apparent hereinafter.

Figure 6:
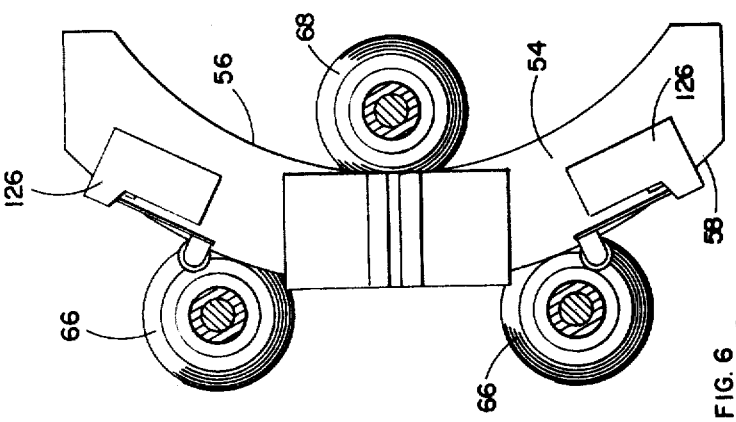
FIG. 6 is a vertical sectional view taken along line 6—6 of FIG. 5.
Figure 5:
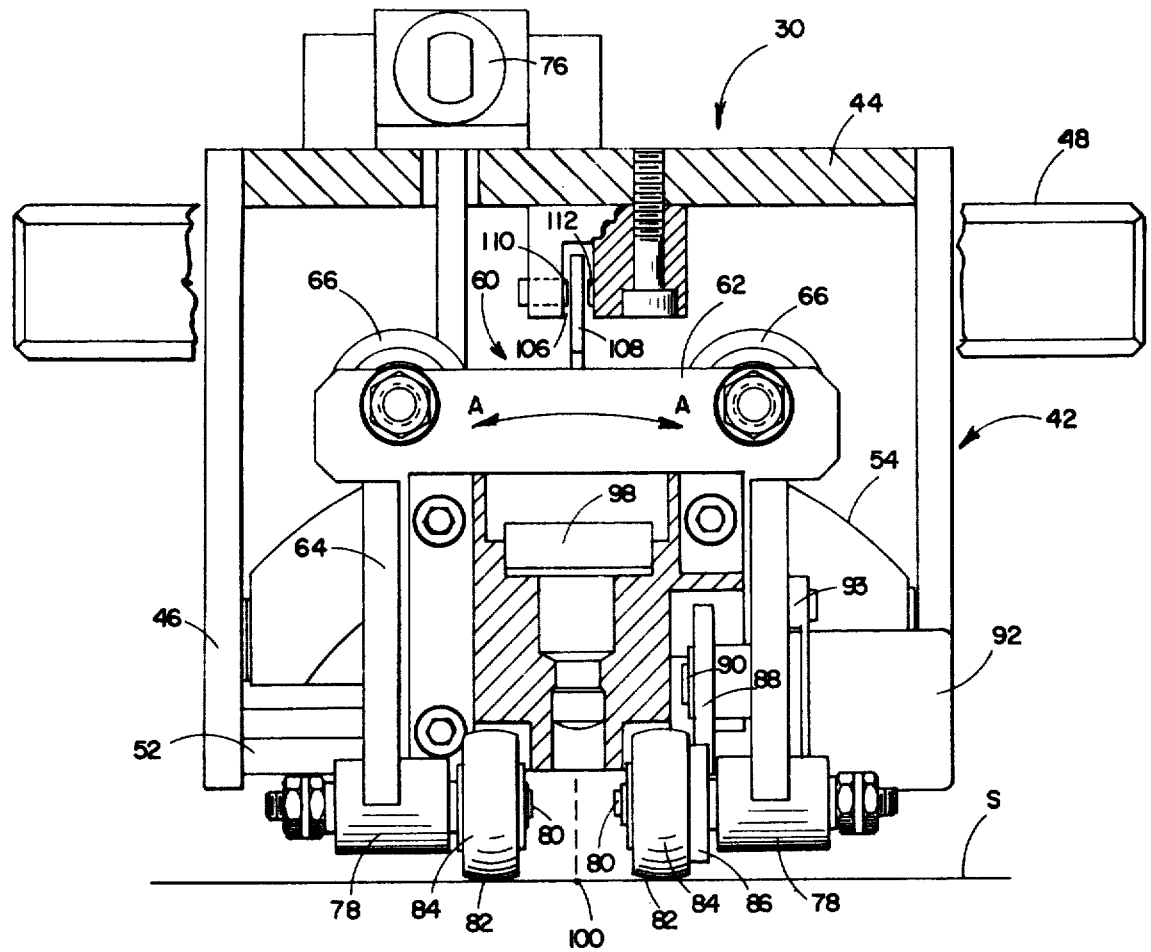
FIG. 5 is a left end elevational view of the digitizing head of FIG. 3, partially broken away and in section.

By further reference to FIGS. 5 and 6 of the drawings, it can be observed that the frame 60 is capable of movement in an arcuate path, conforming to the arcuate A coordinate axis. Thus, if the tape head T was shiftable through the arcuate A axis, with respect to the work surface S, the frame 60 would similarly shift through an arcuate axis proportionately conforming to the arcuate A axis of movement of the tape head T.

Mounted on the lower end of each of the side plates 64 are transversely aligned bearing blocks 78 for journaling transversely aligned coaxially located roller shafts 80 for rotatable movement with respect to the housing 42 are a pair of sensing rollers 82 or so-called "tracking rollers". Each of the rollers 82 have arcuately shaped annular riding surfaces 84 so as to essentially conform to the shape of the work surface S upon which they ride. Also mounted on the shaft 80 is a pinion gear 86 which meshes with a spur gear 88, the latter being mounted upon a shaft 90, which drives a rotary switch encoder or so-called "shaft encoder" 92. This rotary switch encoder 92 operates in relationship to the rotation of the tracking wheels 82 and, in this respect, will provide a measure of distance over which the tracking wheels 82 have been moved and, hence, a measure of the distance of movement of the digitizing head 30 in the longitudinal X axis. In addition, a tachometer 93 or so-called "tack generator" will provide a voltage signal proportional to the speed of the tape placement head T. Actually the rotary switch encoder 92 and the tachometer 93 are optional and not necessary for the operation of the system and, therefore, have not been included in the electricaal schematic circuitry hereinafter described.

By further reference to FIGS. 4 and 5, it can be observed that the tracking wheels 82 essentially function as the applicator roller 24 on the tape placement head T. Thus, as the tracking rollers 82 move along a work surface S, they will effectively represent rotation about the axial centerline of the mounting shaft 48, inasmuch as the entire housing 42 is mounted about the mounting shaft 48.

also mounted on the frame 60 and extending forwardly thereof is a sensor housing 94 carrying a light source 96, and which source directs a beam of light upon the work surface S and more particularly, upon the retroflective tape 32. By further reference to FIGS. 4 and 5, it can be observed that the centerline of the photocell 98 lies directly between the tracking rollers 82, and is essentially perrpendicular to the axis of rotation of the tracking rollers 82. In addition, the vertical centerline passing through the photocell 98 is also perpendicular to the axis passing through the mounting shaft 48. In this respect, the frame 60 rotates about the guide rail 54 through an axis of rotation about the point designated as 100 in FIG. 5. This point 100 represents the vertical centerline of the photocell 98 at its intersection with the work surface S. In addition, it can be observed that the bottom wall 102 of the sensor housing 94 is substantially parallel to the work surface S, and this parallelism is always maintained during movement of the digitizing head 30 with respect to the work surface S.

Figure 11:
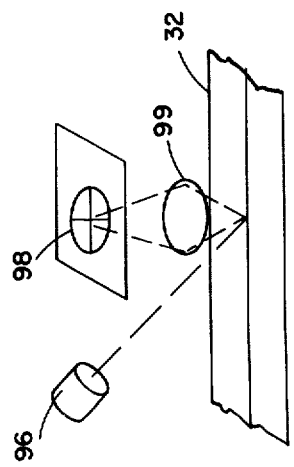
FIG. 11 is a schematic perspective view of the technique of reflecting an image from a reflection tape to a photocell forming part of the system of the present invention.

A lens 99, more fully illustrated in FIG. 5 of the drawings, is interposed between the photocell 98 and the tape 32 in order to focus the light source 96 reflected from the tape 32 onto the photocell 98. By reference to FIG. 3, and as more fully schematically illustrated in FIG. 11, it can be observed that the light source 96 is so located that light directed onto the tape 32 will be reflected into the lens 99 and hence introduced onto the photocell 98. The lens 99 serves an important function in that it compensates for the distance between the lower margin of the rollers 82 and the surface of the photocell 98. Since the photocell 98 is spaced upwardly from the tape 32, it would not otherwise measure the proper distance relationships inasmuch as the lower margin of the tape lay-down roller 24 actually engages the work surface S. However, since the light is reflected from the tape 32 on the surface S, through the lens 99 to the photocell 98, this distance problem has been obviated.

In view of the above-outlined construction, it can be observed that when the digitizing head 30 is replaced for the tape placement roller 24 on the tape head T, that it is capable of the same five distinct axes of movement as the tape head T, which carries the tape placement roller 24. In this respect, the tracking rollers 82 will move the work surface S in accordance with the same movement which would have been experienced by the tape placementt roller 24.

The housing 42 will move in the longitudinal X axis and the transverse Y axis with the tape head T. In this respect, the distance moved in the transverse Y axis or the longitudinal X axis can be measured by the rotary switch encoder 92. Movement of the digitizing head 30 in the rotational C axis will also result when the tape placement head T is rotated about its vertical Z axis. In this respect, rotation of the tape head T will result in rotation of the digitizing head 30 about a vertical axis of rotation passing through the mounting shaft 48, and passing through the axis of rotation of the tracking rollers 82, namely that axis of rotation which intersects the point 100, reference being made to FIG. 5. The sensing of this C axis rotation is also accomplished by the photocell 98 in a manner to be hereinafter described in more detail.

Vertical movement in the Z axis will be detected by the digitizing head as the frame 60 and the members carried thereby pivot about the pivot pins 50. Thus, as the digitizing head 30 is moved over a surface of compound or complex curvature, which may have raised hump or hill portion thereon, the tracking rollers 82 will cause the frame 60 and the sensor housing 94 to pivot about the pivot pins 50. It can be observed, however, that the remaining portions of the housing 42 will not pivot about the pivot pins 50. Furthermore, it can be observed that the bottom wall 102 of the sensor housing 94 will always maintain parellelism with respect to the work surface S.

When the tracking rollers 82 ride upon a surface which creates movement in the arcuate A coordinate axis, it can be observed that the frame 60 will pivot about the guide rail 54 by means of the rollers 66 and 68. Thus, by reference to FIG. 5, if the work surface presented a downwardly extending incline to the left, the frame 60 would shift about the guide rail 54 to the left. Again, it should be observed that the bottom wall 102 of the sensor housing 94 will always maintain its parallelism with respect to the work surface S. Again, it should be observed that movement in both the A axis and the X axis could also be achieved simultaneously, along with movements in the other axes previously described.

In this respect, the air cylinder 76 is actuated so that the piston 74 is urged outwardly. As this occurs, the biasing rod 72 will urge the bracket 70 downwardly, and hence force the tracking rollers 82 into engagement with the work surface S. The application of pressure upon the tracking rollers 82 is desirable inasmuch as compensation for the weight of the digitizing head 30 can be provided by adjusting the pressure through the air cylinder 76.

Rigidly mounted on the underside of the top wall 44, in the manner as illustrated in FIGS. 3 and 5 of the drawings, is a retaining block 104 having an elongated slot 106, which is sized to slidably accommodate a light sensor shield 108, the latter being connected to and movable with the bracket 70. Carried by the sensor block 104 on one side of the elongated slot 107 are a pair of longitudinally spaced light sources 110. Also mounted on the opposite side of the elongated slot 106, are a pair of longitudinally spaced photocells 112, which are in transverse alignment with the respective light sources 110. Furthermore, by reference to FIGS. 3 and 5 of the drawings, it can be observed that the light sources 110 and the photocells 112 are located substantially near the ends of the shield 108. Thus, any movement of the shield 108 pursuant to the movement in the Z axis, that is, movement about the pivot pins 50, will cause one of the photocells 112 to become at least partially exposed to the associated light source 110. In addition, a pair of limit switches 114 are located at each of the opposite ends of the block 104 to detect end point movement in the Z axis, and cause termination of movement beyond this end point.

The bracket 70 is also provided with a transversely extending elongated slot 116 for slidably receiving a light sensor shield 118, which is attached to the frame 60 by means of a horizontally disposed rearwardly extending bar 120. Mounted within the bracket 70 are a pair of transversely spaced and aligned light sources 122, which are located to direct light upon a pair of transversely spaced apart and aligned photocells 124 located on the opposite side of the elongated slot 116. Again, the various photocells 124 and the associated light sources 122 are located near the transverse ends of the light sensor shield 118, so that slight movement of the shield 118 in either direction will permit at least a portion of one of the photocells 124 to be exposed to the associated light source. It should be observed therefore that the photocells 124 provide a current indication of movement of the digitizing head 30 through the A axis. Furthermore, a pair of limit switches 126 are also located along the guide rail 54 to automatically terminate movement of the entire tape head T and hence the digitizing head 30 when the frame 60 moves in the arcuate A axis to the position of either of the limit switches 126. These limit switches are connected in the main power circuitry to accomplish this result in a manner to be hereinafter described in more detail.

Figure 8:
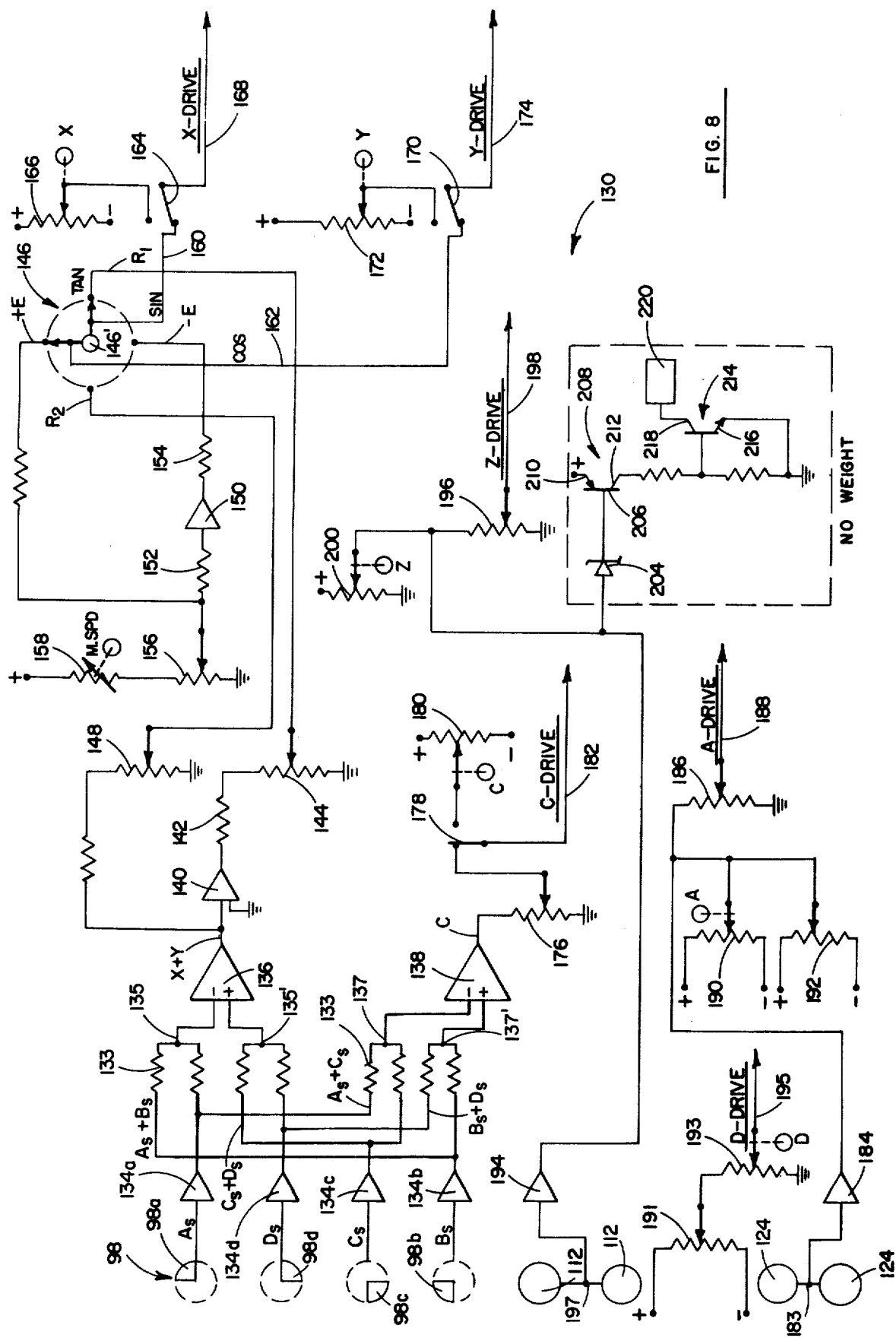
FIG. 8 is a schematic diagrammatic view of an electrical control circuit showing part of the digitizing system of the present invention.

The digitizing system of the present invention also comprises a control circuit 130 which is more fully illustrated in FIG. 8 of the drawings and which operates in conjunction with the digitizing head 30. This control circuit 130 forms part of a main drive circuit 131 which is more fully illustrated in FIG. 10 of the drawings. In addition, the digitizing system comprises a manual control box 132 which forms part of the control circuit 130, and which is more fully illustrated in FIG. 9 of the drawings.

The control circuit 130 includes the photocell 98, which in this case, is preferably a resistive type of photocell, such as the type formed of silicone material where the resistance decreases with respect to an increase in the intensity of the light. In addition, the photocell 98 is a four quadrant photocell where a pair of perpendicularly located cross lines 134 divides the photocell into a first quadrant 98a, a second quadrant 98b, a third quadrant 98c, and a fourth quadrant 98d. Each of the quadrants in the photocell 98 are of equal size aand resistive capability. The photocell 98, futhermore, is designed to provide informational control signals with respect to movement in the X axis and the Y axis, as well as the rotary C axis.

By further reference to FIGS. 4 and 8, it can be observed that the photocell quadrants 98a and 98d serve as a right half of the cell 98 in the direction of movement of the digitizing head 30 in the longitudinal X axis. The cell quadrants 98b and 98c which serve as a left half of the cell 98, and in combination with the cell quadrants 98a and 98d, can detect unauthorized transverse or Y movement way from the retroflective tape 32 during movement in the X axis. Thus, if the digitizing head 30 should move to the right, beyond a preestablished tolerance limit, the photocells 98a and 98d would have reduced photoelectrically generated signals from the retroflective tape 32 and would thereupon cause the generation of an information control signal to thereby enable movement to the left. In like manner, if the digitizing head 30 should move to the left beyond a preestablished tolerance limit, the photocells 98b and 98c would have photoelectrically generated signals from the retroflective tape 32, and would thereupon generate an information control signal to move the digitizing head to the right. These information control signals are corrective signals which may be generated by any of the photocell quadrants, and essentially serve to correct the movement of the digitizing head 30, and hence the tape placement head T. However, even during the corrective action, these corrective signals are used to generate the control program. Thus, in this respect, the corrective signals serve as a null-seeking voltage, in a manner to be hereinafter described in more detail.

It can be observed that the photocell quadrants 98a and 98d operate as a right half of the photocell and that the quadrants 98d and 98c operate as a left half of the photocell for detection of movement in the Y axis. Again, corrective signals, and hence information control signals, are generated for movement in the Y axis much in the same manner as movement in the X axis.

All four quadrants of the photocell 98 are used for detection of movement in the C axis. In this way, the voltages generated by any of the photocell quadrants can be compared during rotary movement. Thus, the quadrant 98d would be compared with quadrant 98b, and quadrant 98a would be compared with quadrant 98c. Thus, movement in the C axis can also be determined. In this respect, it should be observed that each of the photocell quadrants effectively act in pairs so that each of the pairs would normally detect the same light output, which is reflected from the tape 32. Consequently, if one of the photocell quadrants in a pair of such quadrants detects more light than the other of the quadrants, then an error signal or corrective signal is generated.

Each of the quadrants of the photocell 98 generate a voltage signal and each have an associated preamplifier 134a, 134c and 134d, respectively. These preamplifiers are normally identical in their construction, and each would normally include a capacitive feedback circuit in combination with a resistive feedback circuit. Preferably, a potentiometer would be included within the resistive feedback circuit in order to adjust the gain of the amplifier. The output of each of the amplifiers 134a–134d are introduced into pairs of summing resistors 133 connected as illustrated in FIG. 8 with each of two pairs of summing resistors forming a first pair of summing nodes 135 and 135' and each of two remaining pairs of resistors 133 forming a second pair of summing nodes 137 and 137'.

The first pair of summing resistors 133 at the summing node 135 form a combined signal from the quadrants 98a and 98b designated as an $A_s + B_s$ signal. The second pair of resistors at the summing node 135' form a $C_s + D_s$ signal. The summing node 137 forms an $A_s + C_s$ signal and the summing node 137' forms a $B_s + D_s$ signal. The outputs of the summing nodes 135 and 135' are introduced into negative and positive input terminals of a differential amplifier 136 and the outputs of the summing nodes 137 and 137' are introduced into negative and positive input terminals of a differential amplifier 138, in the manner as illustrated in FIG. 8 of the drawings. Again, the summing amplifiers 136 and 138 would preferably have a resistive feedback circuit connected thereacross, and would also include a potentiometer for purposes of internal adjustment and balancing. In like manner, the inputs to the amplifiers 136 and 138 would normally be provided with matched input resistors. The output of the amplifier 136 provides the combination X and Y axis signals and the output of the amplifier 138 provides the C axis signal.

The summing amplifier 136 generates an output to an invertor 140, which has another input thereof grounded, in the manner as illustrated in FIG. 8. The invertor 140 is designed to invert the signal received from the amplifier 136. Again, the invertor 140 would have a balancing potentiometer connected thereacross as well as a resistive feedback circuit connected across the input and output ends thereof. The output of the invertor 140 is connected through an output resistor 142 to a servo-gain potentiometer 144, the movable element of which is connected to a sine-cosine potentiometer 146, and which effectively serves as a two-phase voltage divider. The potentiometer 146 is further designed to separate the X signal from the Y signal.

Figure 12:
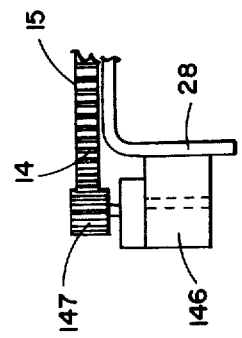
FIG. 12 is a side elevational view showing the connection of one of the potentiometers forming part of the control circuit of FIG. 8.

The potentiometer 146 is mounted on the main frame 18 of the tape head T on the side thereof not shown in FIG. 1, but which is more fully schematically illustrated in FIG. 12 of the drawings. The potentiometer 146 carries at its upper end a gear box and pinion gear combination 147 which mates with the gear segment 14 on the support ring 15 and in this way operates a central rotatable core element 146' in the potentiometer 146. The core element 146' will thus rotate with the tape head T through the C axis. Thus, if the head were moving in the X direction, a minus signal, e.g. −10 v., would be derived at the $R_1$ terminal and a positive signal of equal magnitude, e.g. +10 v., would be derived at the $R_2$ terminal. Deviation from the X position would increase the voltage at either one of these terminals and increase the voltage at the other of the terminals thereby deriving X and Y control signals.

It can be observed that the $R_1$ output terminal of the potentiometer 146 provides a tangent output, designated as TAN, and which serves as an input to the servo-gain potentiometer 144, in the manner as illustrated in FIG. 8 of the drawings. The $R_2$ output terminal of the potentiometer 146 is connected to the movable element of a second servo-gain potentiometer 148. This potentiometer 148 is also connected across an input to the invertor 140, in the manner as illustrated in FIG. 8.

The terminal designated as +E of the sine-cosine switch 146 is connected to the input of a speed-control amplifier 150 through an input resistor 152. The output of the amplifier 150 is connected through an output resistor 154 to the −E terminal of the sine-cosine switch 146. The amplifier 150 would normally be provided with a speed-balance control potentiometer (not shown) and would also normally include a resistive feedback circuit thereacross.

The speed control amplifier 150 receives an input from a speed potentiometer 156 which is connected in series with a maximum speed potentiometer 158, the latter being connected to a positive source of external voltage, such as a twelve volt source. In this way, the potentiometer 158 provides a course adjustment and the potentiometer 156 provides a fine adjustment with respect to speed control of the digitizing head 30, and hence the tape placement head T. The potentiometer 156 is provided with a control knob mounted on the control box 132, and which is designated as SPD, and the potentiometer 158 similarly has a control knob mounted on the control box 132, and which is designated as M.SPD.

The sine-cosine switch 146 is provided with a pair of rotary contact arms, one of which generates a sine output designated as 160, and the other of which generates a cosine output designated as 162. The sine output 160 of the potentiometer 146 provides one terminal of a two position switch 164, the other terminal of which is connected to a X-drive potentiometer 166. The potentiometer 166 is provided with a control knob designated as "X" on the control box 132. Furthermore, the movable element of the two position switch 164 is connected to an X-drive output 168. In like manner, the cosine output of the sine-cosine potentiometer 146 is connected to one terminal of a two position switch 170. Again, the other terminal is connected to the movable element of a Y-drive potentiometer 172, also having a control know designated as "Y", on the control box 132. The movable element of the switch 170 is then connected to a Y-drive output 174.

The potentiometer 146 operates in such manner that it paritally serves as a voltage divider. Thus, if a +10 volts were applied across the +E terminal, and a −10 volts were applied across the −E terminal, the cosine signal would be a positive 10 volts and the sine signal over the output 160 would be 0 volts. If the sine and the cosine arms were rotated approximately 45°, the cosine output 162 would be approximately a +5 volts, and the sine output would be approximately a −5 volts. In this way, these X drive and Y drive outputs are a function of each other.

The X drive output 168 and the Y drive output 174 are, in turn, connected through conventional circuitry (not shown) to the numeric control system or other system which is to be programmed based on the output of the circuit 130. Thus, it can be observed in this respect, that outputs of the various quandrants of the photocell 98 are only generated when a so-called "error signal", that is, a signal detecting unauthorized movement is generated. The photocell thereupon enables the generation of a corrective signal in order to correct the movement of the tape head T and in this respect, this corrective signal, in the form of a voltage, serves an information control signal since it is essentially a null-seeking voltage.

Figure 9:
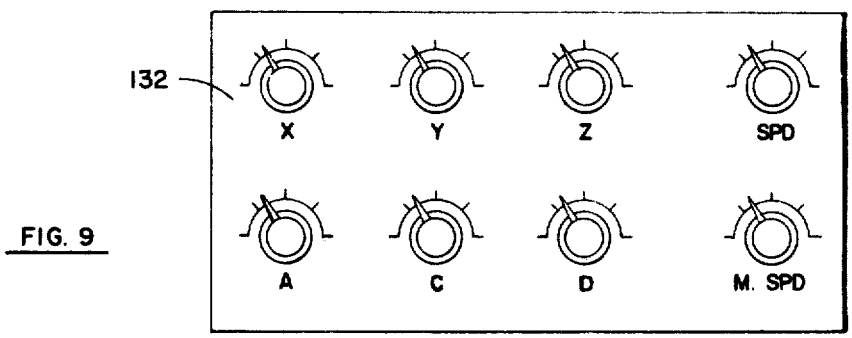
FIG. 9 is a front plan view of a control box which is used in conjunction with the electrical circuit of FIG. 8.

The amplifier 138 is provided with an output which is, in turn, connected to a servo gain potentiometer 176. The movable element of the potentiometer 176 is connected to one terminal of a two position switch 178, and the other terminal of which is connected to the movable element of a C-drive potentiometer 180. In like manner, the C-drive potentiometer 180 is provided with a control knob, designated as "C" on the control box 132, in the manner as illustrated in FIG. 9. The movable element of the two position switch 178 is then connected to a C-drive output 182, which is, in turn, operatively connected to the numeric control apparatus or other form of control circuit, as mentioned above.

With respect to the manually operable two position switches, 164, 170 and 178, it can be observed that the operator of the digitizing system of the present invention is able to inject manual control over the operation of the digitizing head itself. Thus, while the digitizing head 30 in combination with the control circuit 130 is capable of generating null-seeking voltages with respect to movement of the head 30, the operator can also introduce manual control signals to the extent desired by operation of the switches 164, 170 and 178. In this respect, the movable elements of the potentiometers illustrated on the control box 132 would also operate in combination with the various switches 164, 170 and 178. Thus, while these latter switches are not actually illustrated on the control box 132, it is nevertheless understood that they are present, either in combination with the potentiometer adjustments, or otherwise.

As indicated in connection with the description of FIGS. 3 and 4 of the drawings, a pair of photocells 124 exist in combination with the associated light sources 122. As also indicated, these photocells 124 are used to detect movement in the A axis. In the circuit 130, as illustrated in FIG. 8, these two photocells 124 act as resistances and are connected in common to a summing point 183, which is connected to a preamplifier 184. The two photocells 124 will have different polarities as for example +10 volts and −10 volts, respectively. When one of the photocells 124 receives more light than the other, a voltage differential will be detected at the summing point 183 which ultimately gives rise to a control voltage. The output of the preamplifier 184 is introduced into an A axis servo-gain potentiometer 186, which has a movable element 188 providing an A-drive output. The servo-gain potentiometer 186 similarly receives an input from an A-drive manually operable potentiometer 190, the latter having a control knob connected to the movable element thereof and being mounted on the control box 132. This movable element is again designated as "A" on the control box 132.

Similarly, a position feedback potentiometer 192 also has a movable element which is connected to the servo-gain potentiometer 186. The potentiometer 192 is generally designed to provide a comparison voltage in order to hold the frame 60 in position. It can be observed that the frame 60 is rockable on the guide rail 54, and hence could very easily swing to the right or to the left due to the weight thereof. However, the potentionmeter 192 provides an offsetting voltage in order to keep the frame 60 from falling to either of its end positions. The movable element of the position feedback potentiometer 182 is basically attached to the tape head T at any desirable location, so that when the movable element of the potentiometer 192 is moved by the tape head T, the position control potentiometer 192 will detect movement of the tape head T in the arcuate T axis relative to the frame 10 toward one of its end positions. In this way, the output of the preamplifier 184 along with any combined input from the manually operable potentiometer 190 provides a true A-drive output through the servo-gain potentiometer 186.

As indicated previously, the A axis movement is somewhat related to the D-axis inasmuch as the A axis movement permits a rotation of the tape head in an arcuate path, which is somewhat parallel to the Y axis and substantially perpendicular to the X axis. In like manner, the D axis which enables rotation of the work surface S also provides rotation of this work surface S about an axis which is substantially parallel to the X axis. Consequently, a potentiometer 191 is provided to control the D-axis movement, and is provided with terminals connected across positive and negative voltage sources, such as positive and negative twelve volt sources. The movable element of the potentiometer 191 is connected through a control knob, designated as "D", on the control box 132. This movable element is connected through a D-drive servo-gain potentiometer 193, and the movable element thereof provides a D-drive output 195, in the manner as illustrated in FIG. 8 of the drawings.

As indicated previously, the pair of photocells 112 provide a Z-drive information control signal. Again, the pair of photocells 112 have outputs connected in common at a summing point 197, as illustrated in FIG. 9. These photocells 112 are also photovoltaic cells as the cells 124 and operate in the same manner The summing point 197 is connected to a preamplifier 194, which in turn has an output connected to a Z-drive servo-gain potentiometer 196, the latter also having a movable element providing a Z-drive output 198. Also connected to the servo-gain potentiometer 196 is a manually operable Z-drive potentiometer 200, in the manner as illustrated in FIG. 8 of the drawings. Again, it can be observed that the photocells 112 provide an information control signal to the servo-gain potentiometer 196, which may be combined with a manually introduced signal through the potentiometer 200. In this respect, the potentiometer 200 has a movable element designated as "Z" on the control box 132, as illustrated in FIG. 9 of the drawings.

The output of the preamplifier 194 is also introduced into a no-weight circuit 202, which includes a zener diode 204 having the output thereof connected to the base 206 of the transistor 208. The emitter 210 of the transistor is connected to a positive source of voltage, such as a twelve volt source, and the collector of the transistor is connected through a voltage dividing network to a second transistor 214. The transistor 214 has the emitter 210 grounded and a collector 218 connected to a relay which functions as a relay cycle stop 220.

This no-weight circuit 202 is provided in order to compensate for no-weight condition on the base frame 52, and the various members carried thereby. The transistor 208 and 214 effectively serve as switches so that when the information control signal is introduced to the servo-gain potentiometer 196, the relay cycle stop 220 will be energized upon excessive movement of the frame 52. Thus, for example, if the tracking rollers 82 should run off of the end of the work surface S, the entire frame 52 would drop and would experience a no-weight condition. In this case the fairly large signal which would be generated through the photocell 112 would turn on the transistors 208 and 214, which effectively serve as switches, and thereby energize the relay cycle stop 220. As this occurs, it will de-energize the main power circuit 131 in a manner to be hereinafter described and thereby stop the movement of the entire frame 60 in the Z axis about the pivot points 50.

Figure 10:
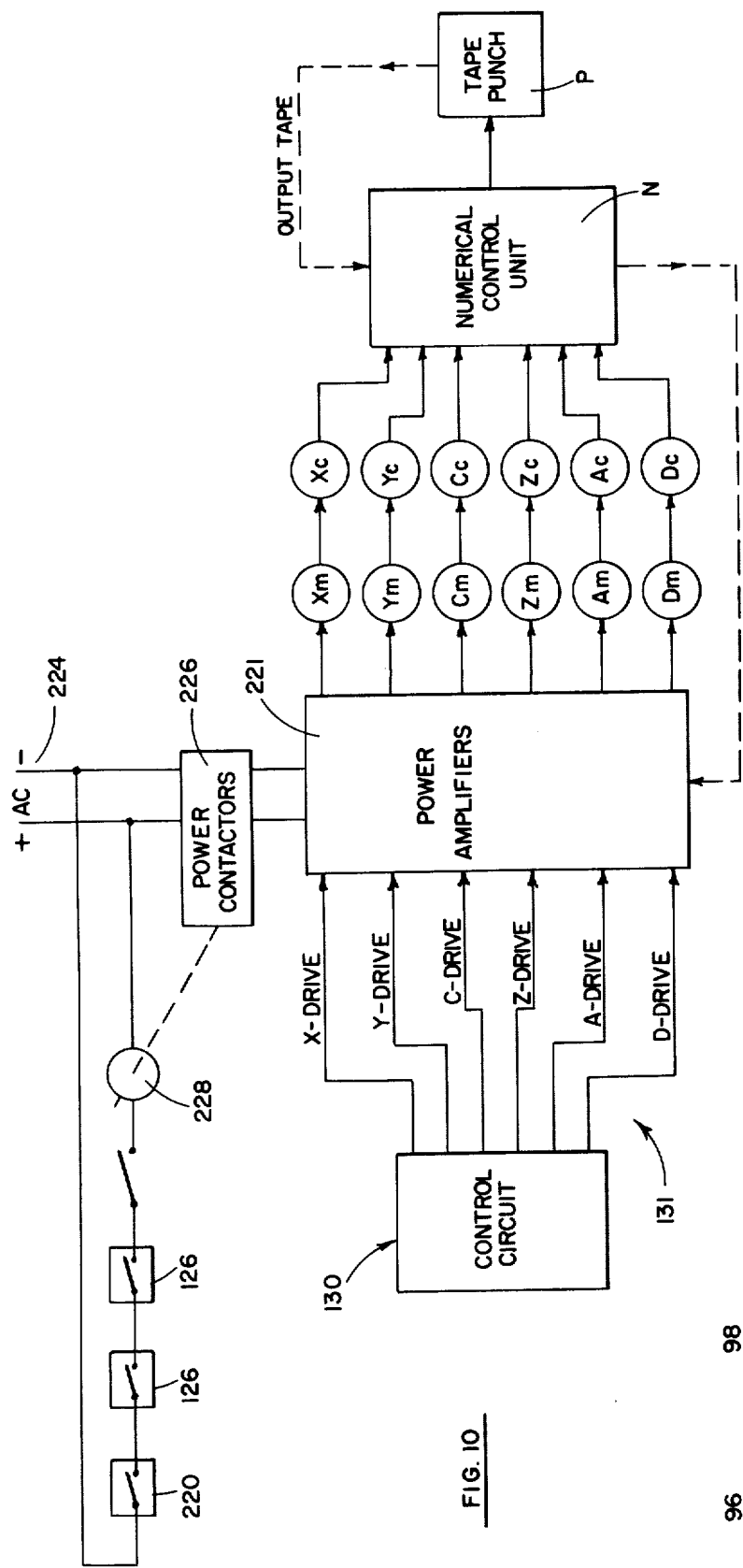
FIG. 10 is a schematic diagrammatic view of an overall electrical circuit showing the operative relationship with the detailed aspect of the circuit of FIG. 8.

As indicated previously, the control circuit 130 forms part of a major overall power circuit 131 which is more fully illustrated in FIG. 10. In this case, it can be observed that the control circuit 130 provides the various input axes drive control signals to power amplifiers 221 and which are essentially conventional in construction and therefore are neither illustrated nor described in any further detail herein. The power amplifiers 221 merely serve to amplify the various axes drive control signals, as for example the X axes drive control signal, and produce outputs which thereafter drive the various axes drive motors, such as the $X_m$ drive motor, the $Y_m$ drive motor . . . $D_m$ drive motor.

The outputs of each of the vaious motors as described above which operate the various components on the gantry machine have output shafts which are connected to digital shaft encoders, as for example, the encoders $X_c$, $Y_c$ . . . $D_c$, as more fully illustrated in FIG. 10 of the drawings. These encoders are not specifically illustrated in the mechanical portions of the drawing in order to maintain clarity. However, it can be observed that each of these encoders, which are essentially conventional in construction, operate on the basis of receiving the drive shaft output from the respective associated motor and generate a series of digital pulses. These digital pulses are therafter introduced into the numerical control unit N which is essentially conventional in its construction. With respect to FIG. 10, it should be observed that the output of the various motors $X_m$ . . . $D_m$ and which serve as inputs to the tachometer $X_c$ . . . $D_c$ are physical connections, e.g. motor drive shafts.

Any of a number of conventional numeric control units may be used in accordance with the present invention. The main function of the numeric control unit, which essentially serves as a digitally programmed computer, is to receive the digital inputs from each of the shaft encoders $X_c$ . . . $D_c$ in order to derive the correct digital signal and hence a move in the associated axis of the tape head T. Thereafter, the numeric control unit generates a combined output signal to be used in operation of a tape punch, designated as P.

The tape punch p can be used to generate an output tape which would in turn be used in order to operate the machine when it is not desired to form the new program based on the design characterization of a new part.

The major overall drive circuit 131 is operated from a source of power, as for example, a 220-volt source of power schematically illustrated as 224 in FIg. 10 of the drawing. The overall drive circuit 131 also comprises conventional power contactors 226 connected in the line from the main power source 224 and which, in turn, drives the power amplifiers 221 upon energization of a contactor coil 228. In essence, the contactor coil 228, when energized, will close contacts (not shown) in the power contactors 226.

Connected in series across the main line in parallel and leading to the power contactors 226 are the pair of serially connected limit switches 126 and the relay cycle stop 220. These various switches are connected in series with the coil 228. Each of these switches is illustrated in the open condition for purposes of clarity. However, it can be observed that in a normal operation these switches would normally be closed. Thus, when any end condition which is undesired is achieved, any one of these switches may open and thereby de-energize the entire circuit to the power contactors 26. Thus, for example, if the relay cycle stop 220 should be actuated so as to "open", it can be observed that the power contactors 226 would be de-energized thereby disenabling the power amplifiers 221 and the entire control circuit 130.

The program which is used to generate the output tape is also conventional. However, it can be observed that the control circuit 130 actually generates null-seeking voltages which provide the various axes drive signals. These drive signals in turn operate the various motors $X_m$ . . . $D_m$ which, in turn, through the various encoders previously described, operate the numerical control unit N and the tape punch P. After the initial program is derived, which essentially forms the system of the present invention, this output tape can actually be used without the control circuit 130 by operating the tape with the proper program thereon in the numerical control unit N. In essence, this numerical control unit N would thereafter provide the desired signals to the power amplifiers 221. It, again, can be observed that the power amplifiers 221 would then drive the various motors $X_m$ . . . $D_m$ in conformity to the initially designed program.

Thus, there has been illustrated and described a novel digitizing system which can be used with a wide variety of equipment of the type which may be operable by some form of external control apparatus. Accordingly, the digitizing system of the present invention may be used in a wide variety of applications, and therefore fulfills all of the objects and advantages sought therefore. Many changes, modifications, variations and other uses an applications of the digitizing system and the method therefore will become apparent to those skilled in the art after considering this specification and the accompanying drawings. All such changes, modifications, variations and other uses and applications which do not depart from the spirit and scope of the invention are deemed to be covered by the invention which is limited only by the following claims.

Having thus described my invention, what I desire to claim and secure by letters patent is:

1. A system for programmably digitizing a control apparatus which provides operation control information to a machine having a work structure movable with respect to a work surface, and which work structure is movable through a plurality of axes including (1) a longitudinal X axis, (2) a transverse Y axis, and (3) an arcuate A axis with movement in an arcuate plane transverse to said X axis and relatively parallel to said Y axis; said system comprising detector means locatable on said work surface defining a desired path of movement of a work member on said work structure, a sensing head replacable on said machine for said work member in substantially the same position which was occupied by said work member, said sensing head comprising a support frame movable by said machine in the X axis and Y axis, a first sensing means associated with said sensing head and spaced from said work surface for detecting said desired path of movement of said work member, a lens means interposed between said detector means and said first sensing means for reflecting light from said detector means to said first sensing means as if said first sensing means were on such work surface to generate informational signals from said first sensing means, transfer means for providing the informational signals developed by said first sensory means to said control apparatus in response to movement of said sensing head on said machine, and a second sensing means on said sensing head movable through a path conforming to said arcuate A axis and also spaced from said said detector means and receiving signals through said lens means to generate informational signals from said second sensing means, said transfer means also providing said last named informational signals to said control apparatus in response to the movement of said second sensing means.

2. The system for programmably digitizing the control apparatus of claim 1 further characterized in that the means associatable with said work surface to define a desired path of movement of said work member is a tracing element locatable on said work surface.

3. The system for programmably digitizing the control apparatus of claim 1 further characterized in that said machine is a composite tape application gantry type machine, said work structure is a tape placement head and said work member is a tap placement means on said tape placement head, and said work surface is a member designed to receive a composite tape from said tape placement head.

4. The system for programmably digitizing the control apparatus of claim 1 further characterized in that said work member is movable through a Z (vertical) axis on said machine, and that said sensing head comprises a third sensing means associated therewith providing informational signals to said control apparatus in response to vertical movement of said sensing head.

5. The system for programmably digitizing the control apparatus of claim 1 further characterized in that said work structure is capable of rotational movement about a rotational C axis, and that the work surface is capable of rotational movement about a D axis relatively parallel to the X axis, and that said sensing head provides informational signals to said control apparatus in response to a combination movement with respect to said D axis or C axis.

6. The system for programmably digitizing the control apparatus of claim 1 further characterized in that said sensing head includes a first movable member which is movable in relationship to desired movement of said work structure in said arcuate A axis.

7. The system for programmably digitizing the control apparatus of claim 4 further charaterized in that said work structure is capable of rotational movement about a rotational C axis, and that the work surface is capable of rotational movement about a D axis relatively parallel to the X axis, and that said sensing head provides informational signals to said control apparatus in response to a combination movement with respect to said D axis or C axis, and that said sensing head includes a second movable member which is movable in relationship to desired movement of said work structure in said vertical Z axis.

8. A method for programmably digitizing a control apparatus which provides information to a machine having a work member movable with respect to a work surface in a plurality of axes, said method comprising locating a tracing element on said work surface defining a desired path of movement of said work member, replacing a sensing head on said machine for said work member and which sensing head is spaced from said work surface, projecting radiation on said tracing element, moving said sensing head along said work surface substantially in conformity with said tracing element, projecting the light reflected from said tracing element through a lens on said sensing head to a photo-electric sensing element carried by said sensing head, generating first informational control signals from said sensing element in response to movement of said sensing head on said machine digitizing said control signals, and transferring the digitized control signals to a control apparatus.

9. The method for programmably digitizing a control apparatus of claim 8 further characterized in that the method comprises detecting an error signal when said sensing head tends to move away from said tracing element, and correcting movement of said sensing head upon detection of said error signal to permit movement of the sensing head substantially in conformity with said tracing element.

10. The method for programmably digitizing a control apparatus of claim 8 further characterized in that said first informational control signals provides information regarding movement of said sensing head in a longitudinal X axis with respect to said work surface, and that said method comprises providing second informational control signals to said control apparatus in response to movement of said sensing head in a transverse Y axis with respect to said work surface.

11. The method for programmably digitizing the control apparatus of claim 8 further characterized in that said machine is a composite tape application gantry type machine, said work member is a tape placement head, and said work surface is a member designed to receive a composite tape from said tape placement head.

12. A sensing head used in programmably digitizing a control apparatus in response to movement through a desired path of a work member removably carried by a work structure mounted on a machine when said sensing head is replaced for said work member on said machine, and where said work structure is movable in a first axis relative to a work surface on said machine, a second axis relative to said work surface and perpendicular to said first axis, a third axis which is arcuate and relatively parallel to said second axis, and a fourth axis which is relatively perpendicular in space to both said first axis and said second axis; said sensing head comprising an outer housing, means mounting said housing to said work structure in substantially the same position occupied by said work member so that said housing is movable with said work structure in said first and second axes, a combination first and second sensing means operatively informational control signals in response to movement of said work structure in said first and second axes, a first frame pivotally mounted in said housing for movement in a first path corresponding to said third axis, third sensing means operatively associated with said first frame and providing informational control signals to said control apparatus in response to movement of said first frame in the first path corresponding to the third axis, a second frame shiftably mounted on said first frame for movement in a second path relatively perpendicular to said first path corresponding to said fourth axis, and fourth sensing means operatively associated with said second frame and providing informational control signals to said control apparatus in response to movement of said second frame in said second path.

13. The sensing head used in programmably digitizing a control apparatus of claim 12 further characterized in that the sensing head is moved with respect to a work surface and in conformity with the shape of a portion of the work surface, and that said sensing head is removably replacable for a tape placement member on a tape placement head which is capable of depositing filament containing tape on said work surface.

14. The sensing head used in programmably digitizing a control apparatus of claim 12 further characterized in that the sensing head is moved with respect to a work surface and in conformity with a portion of the work ;surface in a longitudinal X axis comprising the first axis, a lateral Y axis comprising the second axis, and arcuate A axis somewhat transverse to the X axis, comprising the third axis, and a vertical Z axis comprising the fourth axis, and that said third sensing means provides informational control signals about movement in the A axis and said fourth sensing means provides informational control signals about movement in the Z axis.

15. The sensing head used in programmably digitizing a control apparatus of claim 12 further characterized in that the sensing head is moved with respect to a work surface and in conformity with a portion of the work surface in a longitudinal X axis comprising the first axis, a lateral Y axis comprising the second axis, an arcuate A axis somewhat transverse to the X axis comprising the third axis, and a vertical Z axis comprising the fourth axis, and that said combination first and second sensing means provides informational control signals about movement in the X and Y axes and said third sensing means provides informational control signals about movement in the A axis, said fourth sensing means is operatively associated with said sensing head for providing informational control signals about movement in the Z axis, and that said work work structure and said sensing head are moved in an arcuate C axis relatively parallel in space to said Z axis, and that said combination first and second sensing means is moved with respect to said work surfaces in said C axis for generating fifth informational control signals about movement in the C axis.

16. The sensing head used in programmably digitizing a control apparatus of claim 15 further characterized in that said sensing head is removably replacable for a tape placement member on a tape placement head which is capable of depositing filament containing tape on said work surface, said first frame is movable in the same relative arcuate A axis in which said tape placement member would move so that said third sensing means provides informational control signals about movement in the A axis, and said fourth frame being movable in a path at least somewhat conforming to the same vertical Z axis in which said tape placement member would move so that said fourth sensing means provides informational control signals about movement in the Z axis.

17. A control system for programmably digitizing a control apparatus which provides operation control information to a machine having a member movable through a longitudinal X axis, and a transverse Y axis, said control system comprising first sensing means capable of generating a combination X and Y control signal, amplifier means receiving said X and Y control signal, an electrical potentiometer means receiving the X and Y control signal from said amplifier means, said potentiometer means being a multi-position electrical potentiometer means having a plurality of signal deriving positions thereon, a servo-gain circuit operatively connected across said multi-position electrical potentiometer means and said amplifier means and carrying a servo-gain signal, means deriving an X function position control signal from said potentiometer means, and means deriving a Y function position control signal from said potentiometer means, said X function position control signal being a sine function of the original combined X and Y control signal and the Y function position control signal being a cosine function of the original combined X and Y control signal, and said servo-gain signal being a tangent function of the original combined X and Y control signal.

18. The control system for programmably digitizing a control apparatus of claim 17 further characterized in that said first sensing means comprises a sensor having a plurality of sensing element sections thereon, and each of said sensing element sections being capable of generating an individual control signal, said first amplifier means comprising individual amplifiers receiving the individual control signals.

19. The control system for programmably digitizing a control apparatus of claim 17 further characterized in that the first sensing means comprises a photoelectric sensing means.

20. The control system for programmably digitizing a control apparatus of claim 17 further characterized in that said member is movable through a vertical Z axis, and that said control system comprises second sensing means for deriving a Z function position control signal.

21. The control system for programmably digitizing a control apparatus of claim 17 further characterized in that said member is movable through a vertical Z axis an arcuate A axis which is substantially parallel in space to said Y axis and substantially perpendicular in space to the X axis, and that said control system comprises second sensing means for deriving a Z function control signal and third sensing means for deriving a A function control signal.

* * * * *